US012085831B2

(12) United States Patent
Scofield et al.

(10) Patent No.: US 12,085,831 B2
(45) Date of Patent: Sep. 10, 2024

(54) LINEARIZED MODULATOR

(71) Applicant: ROCKLEY PHOTONICS LIMITED, Altrincham (GB)

(72) Inventors: Adam Scofield, Los Angeles, CA (US); Thomas Pierre Schrans, Temple City, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 281 days.

(21) Appl. No.: 17/753,241

(22) PCT Filed: Aug. 25, 2020

(86) PCT No.: PCT/EP2020/073759
§ 371 (c)(1),
(2) Date: Feb. 24, 2022

(87) PCT Pub. No.: WO2021/037856
PCT Pub. Date: Mar. 4, 2021

(65) Prior Publication Data
US 2022/0299836 A1 Sep. 22, 2022

(51) Int. Cl.
G02F 1/225 (2006.01)
G02F 1/21 (2006.01)

(52) U.S. Cl.
CPC ............ *G02F 1/2257* (2013.01); *G02F 1/212* (2021.01)

(58) Field of Classification Search
CPC .............................. G02F 1/212; G02F 1/2257
See application file for complete search history.

(56) References Cited

U.S. PATENT DOCUMENTS

| 9,329,413 | B1 * | 5/2016 | DeRose ................... G02F 1/025 |
| 2016/0054596 | A1 | 2/2016 | Lee et al. |
| 2019/0041720 | A1 | 2/2019 | Ehrlichman et al. |

OTHER PUBLICATIONS

Dingel, B. et al., "Linearization of Photonic Components for Digital and Analog Optical Fiber Communication Systems (Invited)", 2017 26th Wireless and Optical Communication Conference (WOCC), Apr. 7, 2017, pp. 1-6, IEEE.
International Search Report and Written Opinion of the International Searching Authority, corresponding to PCT/EP2020/073759, mailed Oct. 28, 2020, 11 pages.
(Continued)

*Primary Examiner* — Sung H Pak
(74) *Attorney, Agent, or Firm* — Lewis Roca Rothgerber Christie LLP

(57) ABSTRACT

An electro-optical modulator. The electro-optical modulator comprising: an input waveguide, configured to guide light into a modulation region of the electro-optical modulator; a plurality of sub-modulators, within the modulation region, each sub-modulator having a transfer function between an applied voltage and an optical phase shift; and an output waveguide, configured to guide light out of the modulation region. The combination of the transfer functions of each sub-modulator is such that a total transfer function between an applied voltage and an optical phase shift of the modulation region is substantially linear over a range of operating voltages.

20 Claims, 5 Drawing Sheets

(56) References Cited

OTHER PUBLICATIONS

Kawakami, H. et al., "Novel Optimizing Technique for Linear Optical Mach-Zehnder Modulator and Its Experimental Verification using PAM-8 Signal", 2018 European Conference of Optical Communication (ECOC), Sep. 23, 2018, pp. 1-3, IEEE.
Lee, S. et al., "InGaAsP/InP multimode interference splitter with variable splitting ratio", Physics and Simulation of Optoelectronic Devices VIII Jan. 24-28, 2000, pp. 673-678, vol. 3944, Proceedings of SPIE—The International Society for Optical Engineering.
U.K. Intellectual Property Office Search Report, for patent application No. GB 2013285.8, dated Feb. 15, 2021, 4 pages.
U.K. Intellectual Property Office Examination Report, for patent application No. GB 2013285.8, dated Oct. 27, 2021, 5 pages.
Zhang, Q. et al., "Linearity Comparison of Silicon Carrier-Depletion-Based Single, Dual-Parallel, and Dual-Series Mach-Zehnder Modulators", Journal of Lightwave Technology, Aug. 15, 2018, pp. 3318-3331, vol. 36, No. 16, IEEE.

\* cited by examiner

LINEARIZED MODULATOR

CROSS REFERENCE TO RELATED APPLICATIONS

This application is a National Stage Application of PCT/EP2020/073759, filed 25 Aug. 2020, which claims benefit of Ser. No. 62/891,866, filed 26 Aug. 2019 in the United States; each of the applications identified in this paragraph is incorporated herein by reference. To the extent appropriate, a claim of priority is made to each of the above-identified applications.

FIELD OF THE INVENTION

The present invention relates to an electro-optical modulator, and particularly to an electro-optical modulator which has been linearized with respect to a range of operating voltages.

BACKGROUND

Electro-optical modulators, of various types, have an inherently non-linear transfer function between an applied operating voltage and the optical phase shift which results. This non-linearity is a relatively severe limitation to systems using such modulators.

For example, in analogue applications such as radio over fibre the non-linearity limits the dynamic range and maximum power of the radio frequency signal. This can lead to poor link gain and a higher signal-to-noise ratio. In LIDAR applications, non-linear phase modulators require more bits in the digital-to-analogue converter to compensate. This increases the size and power of the system. In general communications applications, as pulse-amplitude modulation 4 (PAM-4) modulators are non-linear they require a non-linear electrical driver to compensate, which increases the driver complexity and power consumption.

FIG. 1 and FIG. 2 show, respectively, the transfer function of a P-N (depletion) modulator and MOSCAP modulator respectively. The plot is effective change in refractive index $\Delta n_{\mathit{eff}}$ as a function of operating voltage V. The transfer function for the P-N modulator follows a square-root characteristic, where the slope decreases with operating voltage. In contrast, the transfer function of the MOSCAP modulator has a 'knee' characteristic, where the slope abruptly changes at a 'turn on' voltage $V_{th}$. The gradient of the slope after $V_{th}$ is proportional to the capacitance of the modulator $C_{ox}$.

SUMMARY

At a general level, embodiments of the invention are concerned with a linearized modulator formed by cascading multiple sub-modulators with different transfer functions.

Accordingly, in a first aspect, embodiments of the present invention are concerned with an electro-optical modulator, comprising:
an input waveguide, configured to guide light into a modulation region of the electro-optical modulator;
a plurality of sub-modulators, within the modulation region, each sub-modulator having a transfer function between an applied voltage and an optical phase shift; and
an output waveguide, configured to guide light out of the modulation region;
wherein the combination of the transfer functions of each modulator is such that a total transfer function between an applied voltage and an optical phase shift of the modulation region is substantially linear over a range of operating voltages.

Such an electro-optical modulator is thus linearized over a range of operating voltages, and thus overcomes the shortcomings discussed previously. In some embodiments, the transfer function of each sub-modulator is controlled through adjustments in the corresponding junction (P-N or MOSCAP) geometry or doping levels. The total phase shift of the modulator is, in some embodiments, the sum of the phase shifts of each of the sub-modulators (i.e. a superposition of the independent transfer functions) multiplied by the optical length of each sub-modulator. By optical length, it may be meant the path length of light through the sub-modulator.

The electro-optical modulator may have any one or, to the extent that they are compatible, any combination of the following optional features.

At least two of the plurality of sub-modulators may have transfer functions which are different to one another. In some embodiments, each of the sub-modulators may have a transfer function which is different to the other sub-modulators.

The sub-modulators may be carrier-depletion based modulators. For example, each sub-modulator may comprise a P-I-N or P-N junction connected to a pair of electrodes. The transfer function of each sub-modulator may be determined by varying one or more of: an optical length; a depletion width; and a doping level.

The sub-modulator may be metal oxide semiconductor capacitor (MOSCAP) based modulators. For example, each sub-modulator may comprise an oxide barrier between two doped regions such that the resulting structure is usable as a capacitor. The transfer function of each sub-modulator may be determined by varying one or more of: an optical length; an oxide thickness; and a doping level.

The sub-modulators may share common electrodes. That is to say, each sub-modulator may be connected to a same pair of electrodes as the other sub-modulators. The sub-modulators may be driven by a common driver. That is to say, each sub-modulator, in use, may experience the same operating voltage as the other sub-modulators.

The modulation region may be provided within a first arm of a Mach-Zehnder modulator (MZM). A second modulation region may be provided within a second arm of the Mach-Zehnder modulator, the second modulation region may comprise a second plurality of sub-modulators, each sub-modulator of the second plurality of sub-modulators having a transfer function between an applied voltage and an optical phase shift which is different to the other sub-modulators of the second plurality of sub-modulators. The sub-modulators of the second modulation region may be substantially identical to the sub-modulators of the first modulation region. That is to say, each sub-modulator of the first modulation region may have a corresponding sub-modulator in the second modulation region. The second modulation region may be driven by a different driver to the first modulation region. The input waveguide may be coupled to a splitter, which divides the input light between each arm of the Mach-Zehnder modulator. The input light may be split at a ratio of 50:50 between each arm of the Mach-Zehnder modulator. The output waveguide may be coupled to a combiner, which combines light received from each of the Mach-Zehnder modulator.

The modulation region may be within a ring modulator. The ring modulator may be a micro-ring modulator (MRM). The input waveguide and output waveguide may be region of a bus waveguide, and the bus waveguide may include a coupling region coupled to the ring modulator.

The sub-modulators may be silicon based. Alternatively, the sub-modulators may be III-V semiconductor based.

The electro-optical modulator may further comprise a plurality of modulation regions, each modulation region comprising a respective plurality of sub-modulators, the combination of the transfer functions of each respective plurality of sub-modulators being such that the total transfer function of each modulation region between an applied voltage and an optical phase shift of the respective modulation region is substantially linear over the range of operating voltages. The sub-modulators of each modulation region may be driven by a common driver. The modulation regions may share a common ground electrode. The plurality of modulation regions may be located within one arm of a Mach-Zehnder modulator. The electro-optical modulator may further comprise a second plurality of modulation regions in a second arm of the Mach-Zehnder modulator, each modulation region in the second arm comprising a respective plurality of sub-modulators, the combination of transfer functions of each respective plurality of sub-modulators being such that the total transfer function of each modulation region of the second arm between an applied voltage and an optical phase shift of the respective modulation region is substantially linear over the range of operating voltages.

The electro-optical modulator may be a silicon based modulator. The electro-optical modulator may be a III-V semiconductor based modulator.

In a second aspect, embodiments of the present invention provide a method of modulating an optical signal using the electro-optical modulator of the first aspect, the method comprising:
providing an input signal to the input waveguide;
modulating the input signal using the modulation region, to form a modulated output signal; and
outputting the modulated output signal form the output waveguide.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art. All documents mentioned in this text are incorporated herein by reference.

Figure 1:
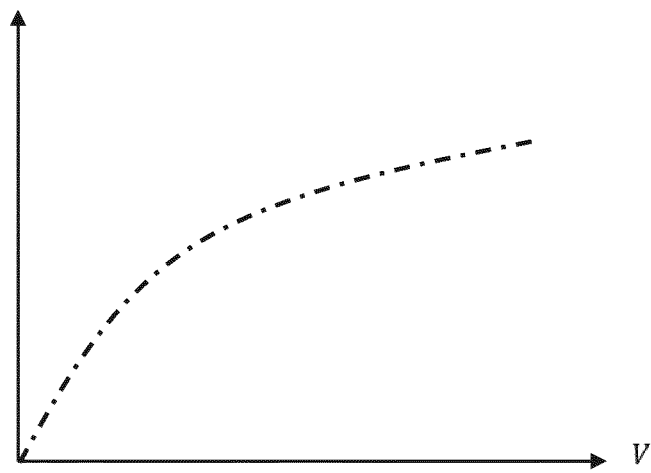
FIG. 1 shows a transfer function of a P-N modulator.
Figure 2:
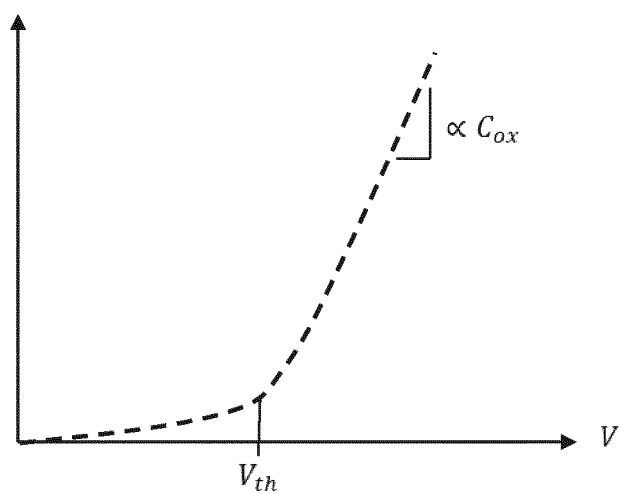
FIG. 2 shows a transfer function of a MOSCAP modulator.
Figure 3:
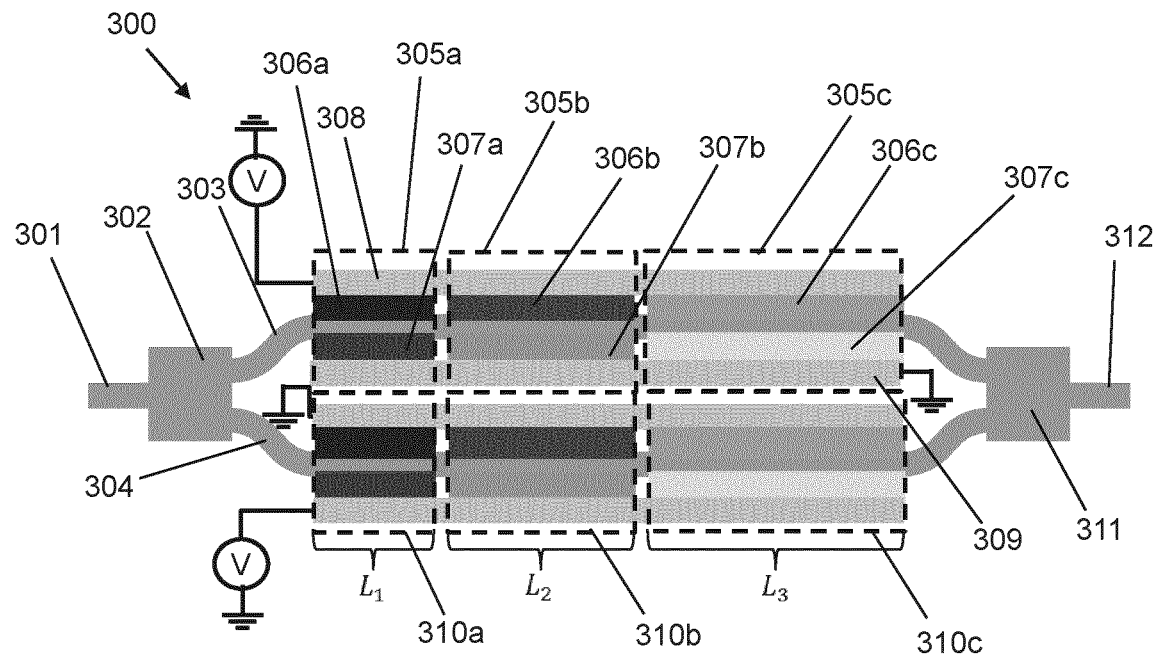
FIG. 3 shows a Mach-Zehnder depletion modulator according to an embodiment of the present invention.

FIG. 3 shows a Mach-Zehnder depletion modulator 300 according to an embodiment of the present invention. Light, in the form of an optical signal to be modulated, enters the modulator via input waveguide 301 and on to splitter 302, which then divides the received signal between a first 303 and second 304 arm of the Mach-Zehnder depletion modulator. In some embodiments the signal is divided equally between each arm of the Mach-Zehnder.

Taking the first arm 303, it is formed of a waveguide extending parallel to the second arm towards an output waveguide 312 of the modulator. Disposed along the first arm, and so along the waveguide, is a modulation region comprising three sub-modulators: 305a, 305b, and 305c. Each of the sub-modulators is formed of a first doped region 306a/306b/306c, as well as a second doped region 307a/307b/307c. The first doped regions are doped with a first species of dopant, and the second doped regions are doped with a second doped species of dopant. For example, the first doped regions may be n doped and the second doped regions may be p doped (or vice versa). In some examples, an intrinsic region is retained between the doped regions, to provide a P-I-N junction. In other examples, no intrinsic region is retained so as to provide a P-N junction. The waveguide in each arm may be a ridge or rib waveguide, and the doped regions may extend up opposite sidewalls of the waveguide. Alternatively, the waveguide may be a ridge or rib waveguide and the doped sidewalls may extend across an upper and lower surface of the waveguide.

The first doped regions 306a-306c are all connected to a shared electrode 308 which extends along the first arm 303 of the modulator. The second doped regions 307a-307c are also connected to a shared electrode 309. In this example, shared electrode 308 is the driving or signal electrode and provides the operating voltage V, whereas shared electrode 309 is the grounding or earth electrode. Each of the sub-modulators 305a, 305b, and 305c has a different optical length: $L_1$, $L_2$, and $L_3$ respectively. The first doped region 306a, 306b, and 306c of each sub-modulator has a different doping concentration to the other sub-modulators as indicated by the degree of shading. In this example, the first sub-modulator 305a has the shortest optical length, $L_1$, but the highest concentration of dopant. Whereas the third sub-modulator 305c has the longest optical length, $L_3$, but the lowest concentration of dopant. The second sub-modulator 305b sits between the first and second in terms of both optical length and dopant concentration. Each sub-modulator also has a depletion region, the width of which can be adjusted to adjust the modulation profile.

The result of having a modulation region so configured, is that each sub-modulator has a different transfer function between the voltage applied V and the phase shift $\phi_n$ imparted to light passing through that sub-modulator. As will be discussed in detail with relation to FIG. 5, this can result in a total transfer function for the modulation region which is substantially linear over a range of operating voltages.

The structure in the first arm 303 is substantially mirrored in the second arm 304. The second arm has a further modulation region, which also comprises three sub-modulators: 310a, 310b, and 310c. The first sub-modulator 310a of the second arm 304 is substantially identical to the first sub-modulator 305a of the first arm 303, as is the case for the second and third modulators of each arm. The ground electrode 309 in the first arm may be shared with the second arm.

At an end of both arms 303 and 304 which is distal to the splitter 302, the two arms converge in an optical combiner 311. It is here that any phase shift imparted to the optical signal within any given arm is used to modulate the amplitude of the output signal, in the manner known per se for Mach-Zehnder modulators. The output signal is then sent through output waveguide 312 for further processing, transmission, or detection.

Figure 4:
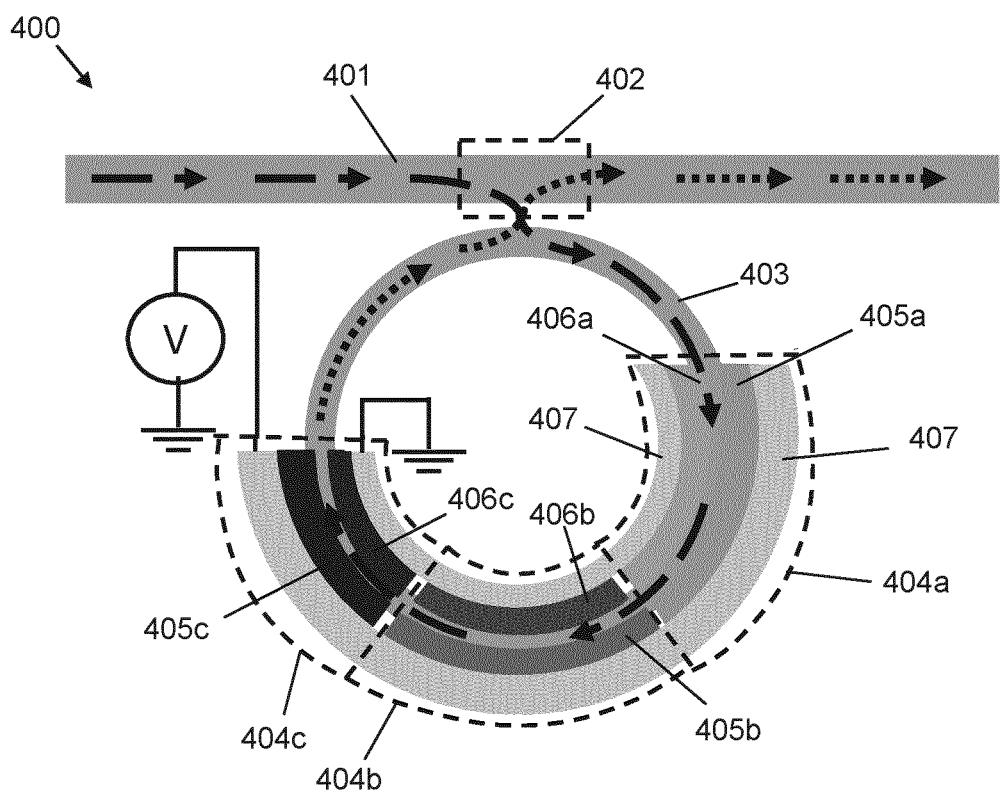
FIG. 4 shows a micro-ring depletion modulator according to an embodiment of the present invention.

FIG. 4 shows a micro-ring depletion modulator 400 according to an embodiment of the present invention. The modulator includes a bus waveguide 401 and a coupling region 402 of the bus waveguide, which couples light transmitted along the bus waveguide into a micro-ring resonator waveguide 403. In this embodiment, the left hand side of bus waveguide 401 is considered the input waveguide, and the right hand side of the bus waveguide is considered the output waveguide. Disposed along the micro-ring resonator is a modulation region comprising three sub-modulators: 404a, 404b, and 404c as indicated by the dashed regions. As with the Mach-Zehnder modulation discussed previously, each sub-modulator includes a first doped region 405a/405b/405c as well as a second doped region 406a/406b/406c. The first doped regions are connected to a shared electrode 407, in this example the driver electrode, which extends around an outer circumference of the micro-ring resonator. Similarly, the second doped regions are connected to a shared electrode 408, in this example the ground electrode, which extends around an inner circumference of the micro-ring resonator. In contrast to the modulator shown in FIG. 3, the first sub-modulator 404a in this example has the longest optical length and the lightest doping concentration and the third sub-modulator 404c has the shortest optical length and heaviest doping concentration.

In use, unmodulated light enters the modulator from the left-hand side of the bus waveguide 401 as indicated by the dashed arrows. It is then coupled at the coupling region 402 into the ring resonator, and passes through each of the sub-modulators, where it is modulated to produce a modulated output (indicated by the dotted arrows). The modulated output is then coupled back into the bus waveguide at coupling region 402, and exits the modulator at the right-hand side of the bus waveguide.

As with the modulator in FIG. 3, by adjusting the optical lengths, the doping concentration, or the depletion width of each sub-modulator relative to the other, the transfer function of the modulation region as a whole can be linearized for a range of operating voltages.

Figure 5:
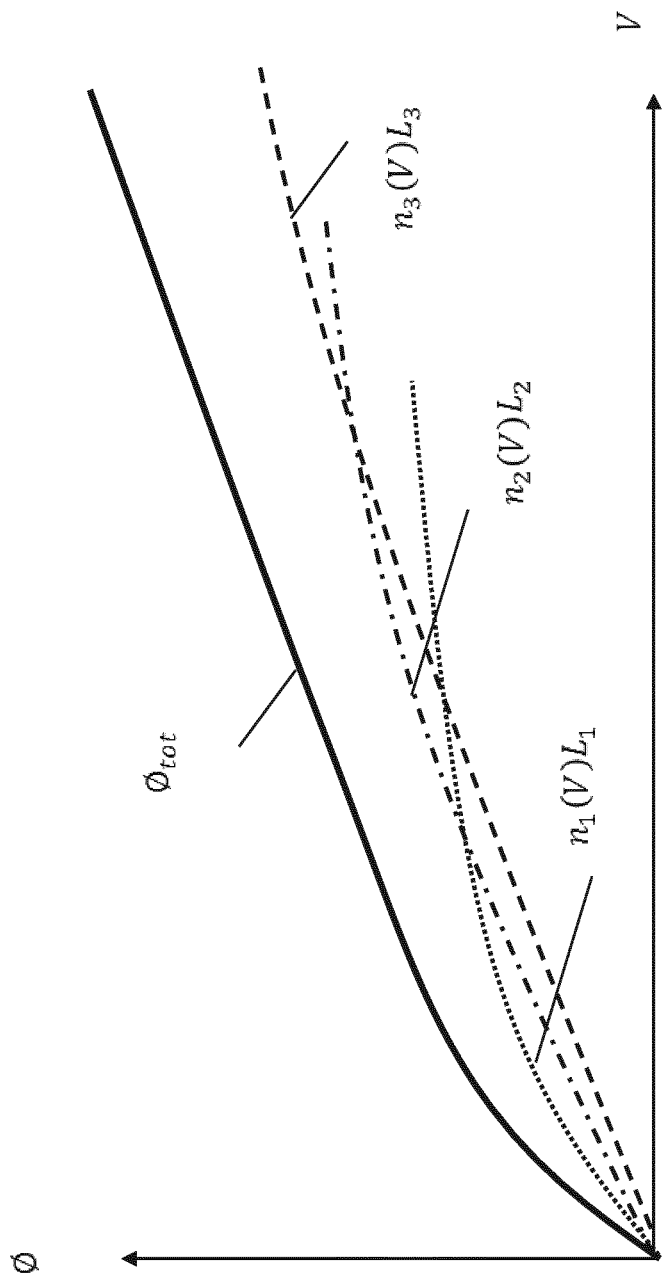
FIG. 5 shows a total transfer function of an electro-optical modulator according to an embodiment of the present invention, formed of the sum of the transfer functions of a plurality of sub-modulators.

This principle is shown in FIG. 5, which is a plot of phase change 4) as a function of applied voltage V. As can be seen, each of the sub-modulators has a different transfer function $n_1(V)L_1$, $n_2(V)L_2$, and $n_3(V)L_3$. The superposition of these transfer functions results in the total transfer function $\phi_{tot}$, which is substantially linear over a wider range of voltages than any of the transfer functions of the individual sub-modulators. The total transfer function may take the form:

$$\phi_{tot} = \phi_1 + \phi_2 + \ldots \phi_n = \left(\frac{2\pi}{\lambda}\right)[n_1(V)L_1 + n_2(V)L_2 + \ldots n_n(V)L_n]$$

where $\phi_n$ is the phase change of the $n^{th}$ sub-modulator, A is the operating wavelength, $n_n(V)$ is the refractive index of the $n^{th}$ sub-modulator when voltage V is applied, and $L_n$ is the optical length of the $n^{th}$ sub-modulator. Typically, such a total transfer function can be arrived at by simulating a range of doping levels or intrinsic regions widths (or both) and extracting the non-linear transfer function of each. An optimization function (such as least-squares) could be used for a combination of N transfer functions to achieve a substantially linear (i.e. the most linear response). This can then be repeated for a different number of regions N until the desired level of linearity is achieved.

Figure 6:
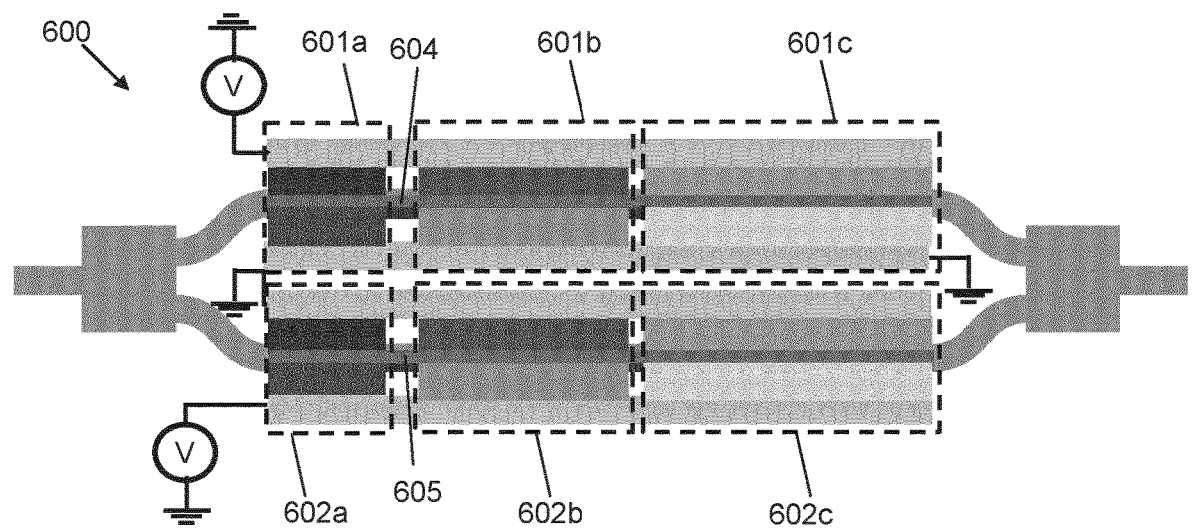
FIG. 6 shows a Mach-Zehnder MOSCAP modulator according to an embodiment of the present invention.

FIG. 6 shows a Mach-Zehnder MOSCAP modulator 600 according to an embodiment of the present invention. The modulator 600 of FIG. 6 broadly shares the same structure as the modulator 300 in FIG. 3, in that it has two arms each having a modulation region. Each modulation region includes three sub-modulators: 601a/602a, 601b/602b, and 601c/602c. In contrast to the modulator in FIG. 3 however, an oxide region 604/605 is present in and along each arm of the Mach-Zehnder. The oxide region allows each modulator to function as a capacitor, and so a constant voltage does not need to be applied to the electrodes in order to modulate a signal.

Further, in contrast to the modulator 300 of FIG. 3, the transfer functions of the sub-modulators of modulator 600 are adjusted by changing any one or more of: the optical length; the oxide region thickness; and the doping concentrations.

Figure 7:
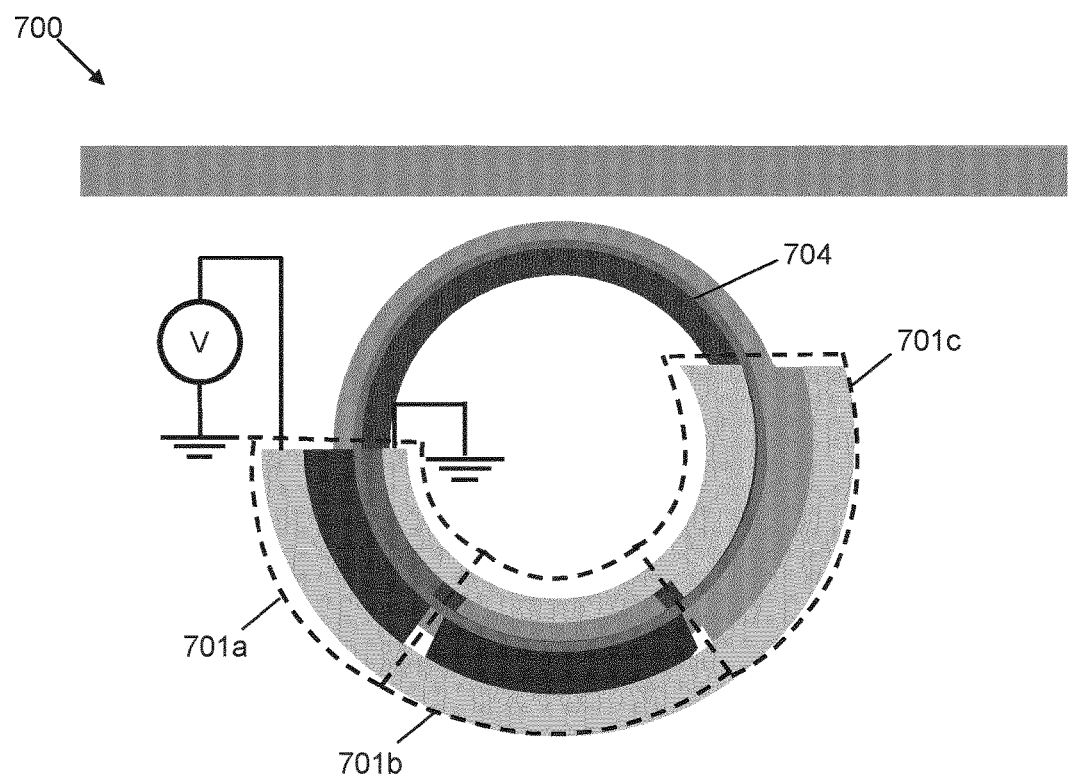
FIG. 7 shows a micro-ring MOSCAP modulator according to an embodiment of the present invention.

FIG. 7 shows a micro-ring MOSCAP modulator 700 according to an embodiment of the present invention. As before, the modulator 700 broadly shares the same structure as modulator 400 in FIG. 4, in that it includes a bus waveguide, a ring resonator/waveguide having a modulation region, and three sub-modulators within the modulation region: 701a, 701b, and 701c. In contrast to the modulator in FIG. 4 however, an oxide region 704 is present within the ring resonator such that the sub-modulators are operable as capacitors, and so a constant voltage does not be applied to the electrodes in order to modulate a signal.

Figure 8:
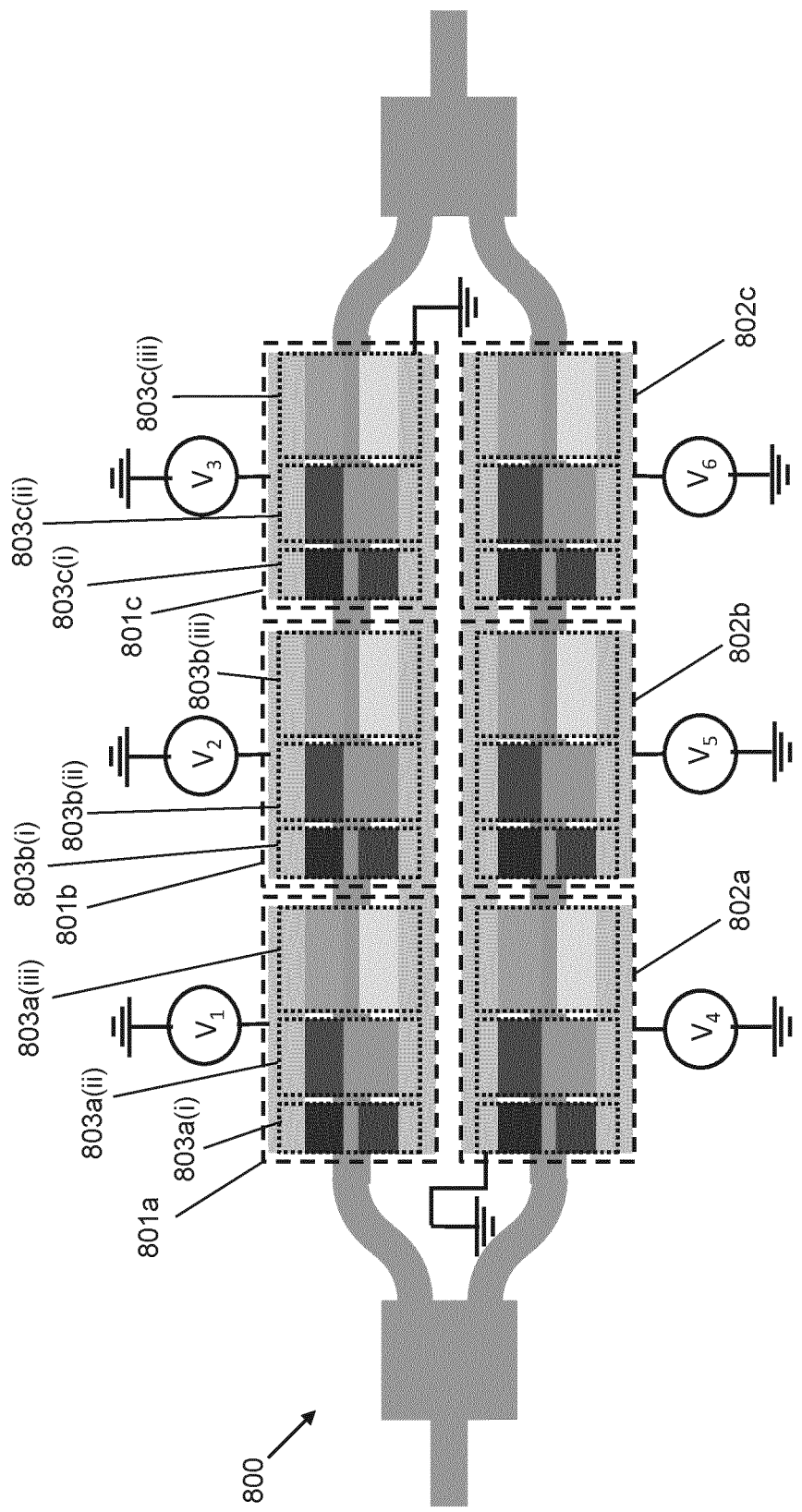
FIG. 8 shows a multi-modulation region Mach-Zehnder depletion modulator according to an embodiment of the present invention.

FIG. 8 shows a multi-modulation region Mach-Zehnder depletion modulator 800 according to an embodiment of the present invention. The broad structure of the modulator 800 matches that of the modulator 300 shown in FIG. 3, in that it includes an input waveguide, a splitter, two arms, a combiner, and an output waveguide. However, along each arm of the Mach-Zehnder modulator in FIG. 8, are plural modulation regions 801a/802a, 801b/802b, and 801c/802c.

Each modulation region, as before, includes a plurality of sub-modulators. In this example, the first modulation region 801a in the first arm includes three sub-modulators: $803a(i)$, $803a(ii)$, and $803a(iii)$. Each modulation region has a respective driving electrode which provides a voltage $V_n$. The modulation regions of the first arm share a common ground electrode. This common ground electrode may also be shared with the modulation regions of the second arm.

Whilst the modulator 800 shown in FIG. 8 uses a depletion junction structure, it may of course use the MOSCAP structure discussed with relation to FIGS. 6 and 7.

The structure shown in FIG. 8 allows for even finer control over the linearization of the transfer function.

Whilst the modulators discussed above utilise the Kerr effect, the invention is equally applicable to other modulators such as those utilising the Franz-Keldysh or Quantum confined Stark effect (so called QCSE modulators). The invention is applicable to any modulator which has parameters which may be adjusted so as to tune the transfer function.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An electro-optical modulator, comprising:
   an input waveguide, configured to guide light into a modulation region of the electro-optical modulator;
   a plurality of sub-modulators, within the modulation region, each sub-modulator having a transfer function between an applied voltage and an optical phase shift; and
   an output waveguide, configured to guide light out of the modulation region,
   wherein a combination of the transfer functions of each sub-modulator is such that a total transfer function between an applied voltage and an optical phase shift of the modulation region is substantially linear over a range of operating voltages, and
   wherein a first transfer function, of a first sub-modulator of the plurality of sub-modulators, is different from a second transfer function, of a second sub-modulator of the plurality of sub-modulators.

2. The electro-optical modulator of claim 1, wherein the sub-modulators are carrier-depletion based modulators.

3. The electro-optical modulator of claim 2, wherein the transfer function of each sub-modulator is based on one or more of: an optical length; a depletion width; or a doping level.

4. The electro-optical modulator of claim 1, wherein the sub-modulators are metal oxide semiconductor capacitor based modulators.

5. The electro-optical modulator of claim 4, wherein the transfer function of each sub-modulator is based on one or more of: an optical length; an oxide thickness; or a doping level.

6. The electro-optical modulator of claim 1, wherein the sub-modulators share common electrodes.

7. The electro-optical modulator of claim 1, wherein the sub-modulators are driven by a common driver.

8. The electro-optical modulator of claim 1, wherein the modulation region is provided within a first arm of a Mach-Zehnder modulator.

9. The electro-optical modulator of claim 8, wherein the modulation region is a first modulation region, and a second modulation region is provided within a second arm of the Mach-Zehnder modulator, the second modulation region comprising a second plurality of sub-modulators, each sub-modulator of the second plurality of sub-modulators having a transfer function between an applied voltage and an optical phase shift which is different to the other sub-modulators of the second plurality of sub-modulators.

10. The electro-optical modulator of claim 9, wherein the sub-modulators of the second modulation region are substantially identical to the sub-modulators of the first modulation region.

11. The electro-optical modulator of claim 8, wherein the input waveguide is coupled to a splitter, which divides the input light between each arm of the Mach-Zehnder modulator.

12. The electro-optical modulator of claim 8, wherein the output waveguide is coupled to a combiner, which combines light received from each arm of the Mach-Zehnder modulator.

13. The electro-optical modulator of claim 1, wherein the modulation region is within a ring modulator.

14. The electro-optical modulator of claim 13, wherein the input waveguide and output waveguides are regions of a bus waveguide, and the bus waveguide including a region coupled to the ring modulator.

15. The electro-optical modulator of claim 1, further comprising a plurality of modulation regions, each modulation region comprising a respective plurality of sub-modulators, the combination of the transfer functions of each respective plurality of sub-modulators being such that the total transfer function of each modulation region between an applied voltage and an optical phase shift of the respective modulation region is substantially linear over the range of operating voltages.

16. The electro-optical modulator of claim 15, wherein the sub-modulators of each modulation region are driven by a common driver.

17. The electro-optical modulator of claim 15, wherein the modulation regions share a common ground electrode.

18. The electro-optical modulator of claim 15, wherein the plurality of modulation regions are located within a first arm of a Mach-Zehnder modulator.

19. The electro-optical modulator of claim 18, further comprising a second plurality of modulation regions in a second arm of the Mach-Zehnder modulator, each modulation region in the second arm comprising a respective plurality of sub-modulators, the combination of transfer functions of each respective plurality of sub-modulators being such that the total transfer function of each modulation region of the second arm between an applied voltage and an optical phase shift of the respective modulation region is substantially linear over the range of operating voltages.

20. A method of modulating an optical signal using the electro-optical modulator of claim 1, the method comprising:
   providing an input signal to the input waveguide;
   modulating the input signal using the modulation region, to form a modulated output signal; and
   outputting the modulated output signal form the output waveguide.

* * * * *